United States Patent

Schulte

[15] 3,670,578

[45] June 20, 1972

[54] CURRENT PULSE GENERATOR

[72] Inventor: Louis T. Schulte, Paris, France

[73] Assignee: TRW Inc., Redondo Beach, Calif.

[22] Filed: Oct. 8, 1970

[21] Appl. No.: 79,239

Related U.S. Application Data

[63] Continuation-in-part of Ser. No. 681,170, Nov. 7, 1967, abandoned.

[52] U.S. Cl. ....................74/5.6, 307/240

[51] Int. Cl. ....................G01c 19/28, H03k 17/56

[58] Field of Search ....................74/5.6, 5.47, 5.41; 307/240; 328/57

[56] References Cited

UNITED STATES PATENTS 3,477,298 11/1969 Howe ....................74/5.6 X
3,435,324 3/1969 Bishop ....................307/240 X
3,238,791 3/1966 Brodersen ....................74/5.6 X
3,549,903 5/1968 Lowdenslager ....................307/240 X

*Primary Examiner*—Manuel A. Antonakas
*Attorney*—Daniel T. Anderson, Harry I. Jacobs and Edwin A. Oser

[57] ABSTRACT

A pulse generator for developing current pulses with precisely controlled rise and fall times. These current pulses are made to pass through a gyro torquer in either one of two directions by means of switches. The gyro torquer current is reversed by digital logic in a pulse rebalanced loop. These current pulses pass through a resistor. The voltage at one end of the resistor is controlled by an operational amplifier. The voltage at the other end of the resistor is controlled so that periodically there is substantially no current flow through either the load or the resistor. This makes it possible to switch the direction of current flow when there is substantially no current flow through the load.

8 Claims, 3 Drawing Figures

INVENTOR.
Louis T. Schulte
BY [signature]
ATTORNEY

INVENTOR.
Louis T. Schulte
BY [signature]
ATTORNEY

CURRENT PULSE GENERATOR

CROSS REFERENCE TO RELATED APPLICATIONS

This application is a continuation-in-part of application Ser. No. 681,170, now abandoned, entitled, Current Pulse Generator, and assigned to the same assignee as this application. Accordingly, the parent application is incorporated herein by reference and made a part of the present application.

BACKGROUND OF THE INVENTION

This invention relates generally to pulse generators, and particularly relates to a system for generating precisely controlled current pulses which can be made to flow through a load at will in either one of two directions.

For many applications it is necessary to provide current pulses where the integral of the current over time has a precise value. In other words, the time the current flows must be precisely controlled to control the energy developed by the pulse.

Such pulse generators may be used, for example, for energizing a pulse rebalanced gyro loop. In that case the time integral of the current pulse controls the torquing rate of the gyroscope. For this reason current pulses with precisely controlled rise and fall times are necessary to minimize errors in the measured input rate.

Conventionally this is effected by utilizing a current regulator to supply regulated current to the gyro torquer. Hence, the current regulator controls the pulse amplitude.

Pulse duration is controlled by a switching system to start and stop the pulses. A conventional switching system causes the current to bypass the load during certain periods to produce a desired average torquer current. During switching, a portion of the current flows through the load, and the remainder around the load. As a result, precise current control is difficult.

It is an object of the present invention to provide a pulse generator capable of developing current pulses with precisely controlled rise and fall times to drive a gyro torquer. Digital switching logic is provided to reverse the current flowing through the torquer at a time when there is substantially no current flowing in the torquer.

A further object of the present invention is to provide a current pulse generator of the type referred to where the current flow through the load is rendered substantially zero by controlling the voltage across a precision resistor so that the voltages at the ends of the resistor become substantially equal.

SUMMARY OF THE INVENTION

In accordance with an example of a preferred embodiment of the present invention, there is provided a pulse generator for precisely controlling the current pulses flowing through a gyro torquer. Digital switching logic controls the direction of current flow through the torquer.

The pulse generator includes an impedance element such as a resistor and a current source which includes an amplifier for supplying current to the load. Switching means are connected between the current source and one terminal of the resistor. These switches are operated so that current pulses flow in either a positive or a negative direction from the amplifier through the load to the resistor. To this end the amplifier has an input terminal connected to one terminal of the resistor and tends to maintain the voltage at the one resistor terminal substantially constant. This is effected by adjusting the current through the load.

The switching means are controlled by digital switching logic which receives error commands from the gyro pickoff. The switching logic causes sufficient current to flow in the gyro torquer in one direction or the other to maintain a preselected gyro gimbal position.

Further in accordance with the present invention, a voltage pulse source is connected to the other terminal of the resistor for periodically rendering the voltage at the other terminal substantially equal to the voltage at the first terminal of the resistor. Hence, since periodically there is no voltage across the resistor, there is no current flow through it. This arrangement permits switching of the direction of current flow through the gyro torquer at a period of time when substantially no current flows through the torquer and through the resistor.

DESCRIPTION OF THE PREFERRED EMBODIMENTS

Figure 1:
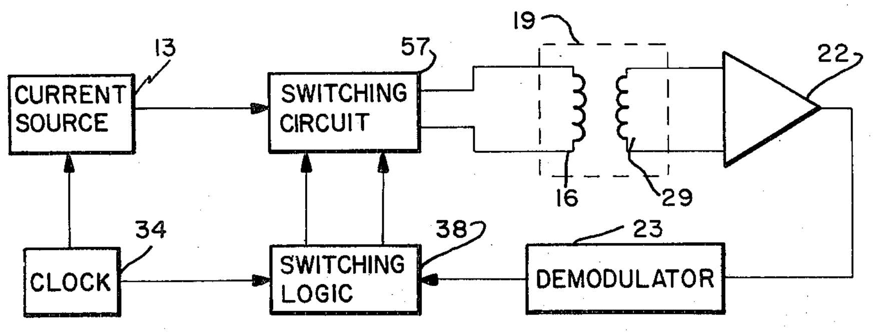
FIG. 1 is a block diagram of a gyro pulse rebalanced loop according to the present invention.

Referring to FIG. 1, there is illustrated a block diagram of a pulse rebalanced loop according to the present invention. A standard gyroscope 19 comprises a gyro torquer motor 16 and a pickoff coil 29. As is well known, pickoff 29 develops an error signal in response to the gyro gimbal turning from a preselected heading, and gyro torquer 16 returns the gimbal to the preselected position in response to the error signal.

An operational amplifier 22 amplifies the pickoff signal and demodulator 23 operates on the amplified pickoff signal to produce an error signal to control switching logic 38.

Figure 3:
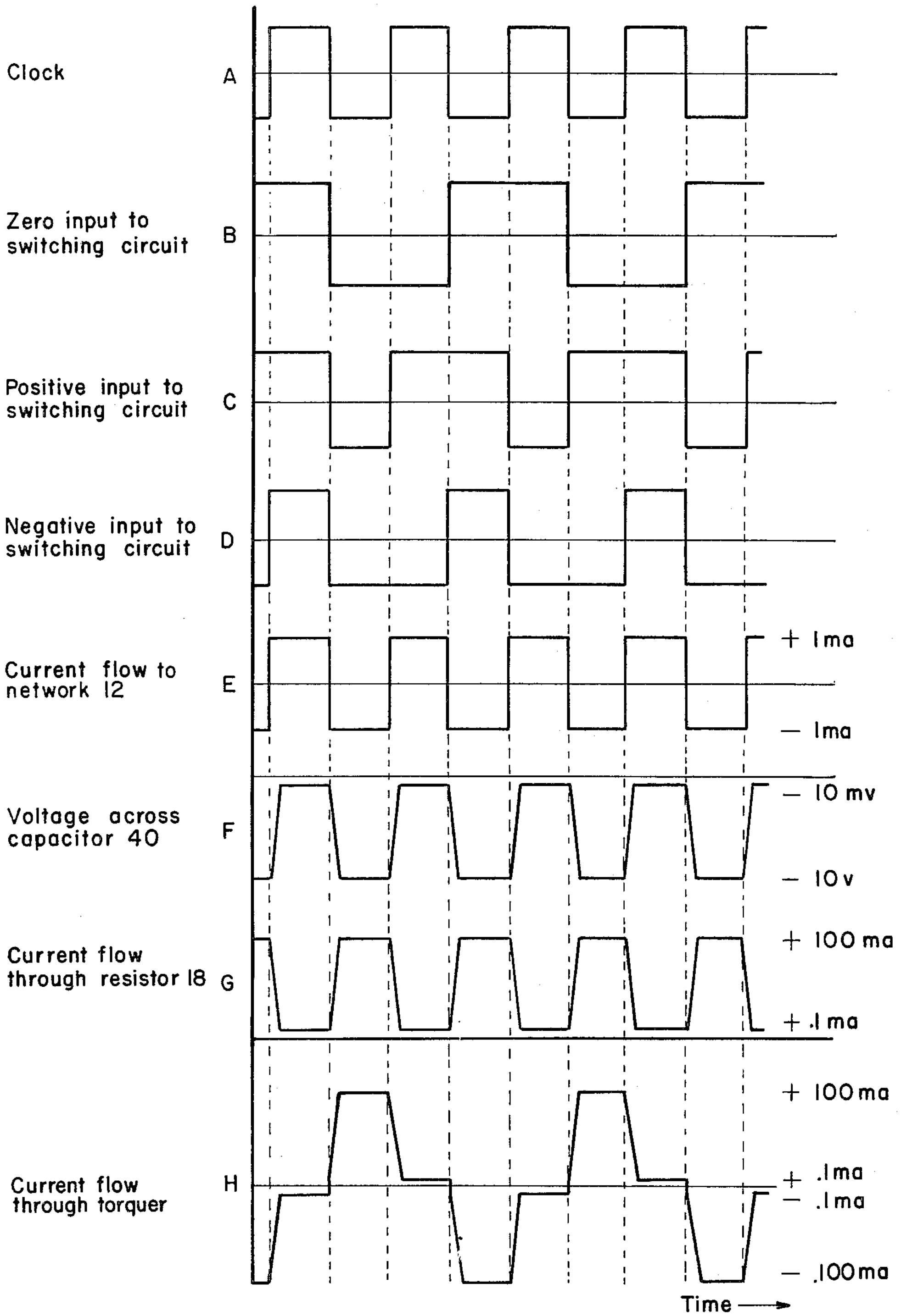
FIG. 3 is a chart showing various voltages and currents plotted as a function of time and which appear at various points of the circuit of FIGS. 1 and 2.

Switching logic 38 is a binary switch driven by clock 34. The output of clock 34 is shown in FIG. 3A. Switching logic 38 follows clock 34 to produce a "zero" binary input to torquer 16 via switching circuit 57. Switching circuit 57 may be any well known set of switches which reverse the current flowing through torquer 16 in response to a pulsed output from switching logic 38.

FIG. 3B shows a "zero" binary input to switching circuit 57, and hence torquer 16. The "zero" input occurs when the gyro gimbal is in the correct position and no error signal is generated by pickoff 29.

When the gyro gimbal moves off its preselected axis, pickoff 29 generates an error signal. Operational amplifier 22 amplifies the error signal and feeds it to demodulator 23 which causes switching logic 38 to change the pulse width of its output. Switching logic 38 may be an analog-to-digital converter which generates a digital signal having a duty cycle proportional to the analog voltage output from demodulator 23. FIGS. 3C and 3D are illustrative of outputs from switching logic 38.

Thus, switching logic 38 responds to an error signal from pickoff 29 to alter its binary output causing torquer 16 to drive the gimbal back to its desired position. The principles of altering a binary signal in response to an error signal are well known and do not form a part of the present invention.

Power for gyro torquer 16 is supplied from current source 13 which provides carefully regulated current pulses which are in synchronism with clock 34.

Figure 2:
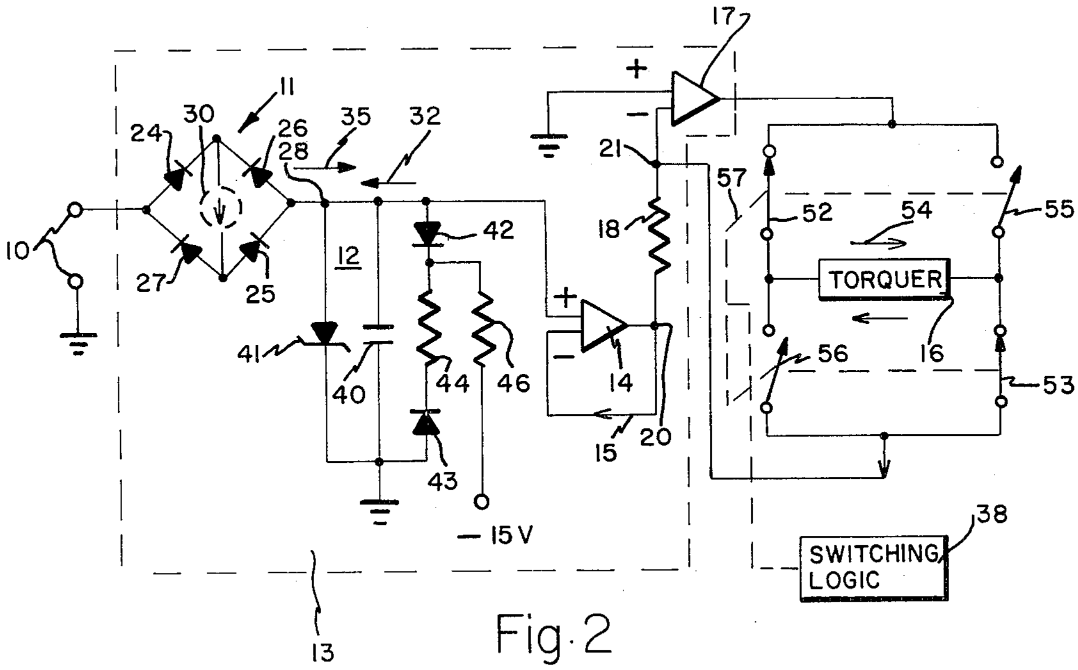
FIG. 2 is a circuit diagram, partly in block form, of a current pulse generator embodying the present invention.

Referring now to FIG. 2, there is illustrated a circuit diagram, partly in block form, of the pulse generator of the invention. The pulse generator generally includes a pair of input terminals 10 on which voltage pulses from clock 34 are impressed. This is followed by a constant current source, generally indicated at 11, for providing current flow in either one of two directions in accordance with the voltage impressed on input terminals 10. A pulse-forming network 12 is coupled to the current source 11 and feeds an amplifier 14 having a feedback path 15. This amplifier 14 preferably is an operational amplifier. A load comprising gyro torquer 16 is connected between another operational amplifier 17 and a precision resistor 18. All of the current flowing through gyro torque 16 also flows through resistor 18. This current flow can be substantially prevented by momentarily rendering the voltage at one terminal 20 of the resistor 18 substantially equal to that at the other terminal 21 thereof.

The constant current source 11 includes a bridge rectifier having diodes or rectifiers 24, 25, 26 and 27. Two opposite terminals of the rectifier bridge are connected between one of the input terminals 10 and an output terminal 28 which is connected in turn to the pulse-forming network 12. A constant current network 30, which may be a transistor network, is indicated schematically and is connected between the other two corners or junctions of the bridge rectifier.

The constant current source 11 operates as follows: The input voltage which is impressed on input terminals 10 is shown generally in FIG. 3A. The negative side may be −30 volts, and the positive side +20v. It may also be assumed that the voltage at the output terminal 28 is, say, between −10v and ground. Accordingly current flows in the direction of arrow 32 through diode 26, current network 30 and diode 27 to one of the input terminals 10. On the other hand, as the input voltage rises to, say, +20v, the direction of current flow now reverses. The current now flows from input terminal 10 through diode 24, current network 30 and diode 25 into the pulse-forming network 12 as shown by arrow 35.

It will be noted that a constant current flows through the current network 30 which may be assumed to be 1 milliampere (ma). This current flows continuously regardless of the direction of current flow except during the very brief switching time. The current flowing into the pulse-shaping network 12 is shown by the current pulses of FIG. 3E. As shown in FIG. 3E, the current is normally flowing in a negative direction which may be defined as the direction of current flow of arrow 32 from network 12 into current source 11. The positive or opposite direction of current flow may be defined as the direction of current flow shown by arrow 35.

The pulse-forming network 12 includes a capacitor 40 connected between the terminal 28 of the current source 11 and ground as shown. A zener diode 41 is connected across the capacitor 40. The zener diode operates as a limiter for limiting the negative voltage which can build up across the capacitor 40 by the breakdown voltage of the diode 41. It will be understood that the capacitor 40 is charged to a negative direction when the current flows in a negative direction as shown by arrow 32, that is, out of the capacitor.

The voltage tends to build up in a linear fashion across the capacitor 40. This voltage is limited in the other direction by a second voltage limiter including two matched diodes 42 and 43 and a resistor 44 of small resistance connected in series. The combination of diode 42, resistor 44 and diode 43 is also connected serially across capacitor 40. The junction point between diode 42 and resistor 44 is fed by a constant current source which may, for example, consist of a −15v source as shown and a resistor 46.

As pointed out before, the two diodes 42 and 43 are matched so that they have equal voltage drops thereacross. For that reason the current through the two diodes should be equal. This may be explained as follows: Assume, for example, that the voltage at the input terminal 10 is +20v and at point 28 is substantially zero. In that case a current will flow, as shown by the arrow 35, into the diode 42. Of course the voltage across zener diode 41 is also approximately zero. The current source represented by the −15v voltage source and resistor 46 may be assumed to cause a current flow of 2 ma. Half of this current, namely, 1 ma, flows through diode 42 into resistor 46, while the other half of the current, namely, the other 1 ma, flows from ground through diode 43 and resistor 44. Assuming that resistor 44 has a resistance of 10 ohms, the 1 ma current will cause a voltage drop of −10 mv thereacross. Since the voltage drops across the two matched diodes 42 and 43 cancel, the voltage across the capacitor 40 is also −10 mv or approximately zero. Accordingly the equal currents provided through the two matched diodes 42 and 43 result in a precise limiting voltage for the capacitor 40.

Thus when the capacitor 40 charges in a positive direction by a flow of current in the direction of the arrow 35, the voltage across the capacitor 40 will go in a positive direction toward zero. Eventually the diode 42 will conduct and will limit the voltage across the capacitor within the neighborhood of ground potential as shown by FIG. 3F. Thus the voltage across the capacitor 40 is normally, say, at −10v, as shown in FIG. 3F, corresponding to the negative direction of current flow as defined by arrow 32. This voltage corresponds to the breakdown voltage of zener diode 41.

The operational amplifier 14 has one of its input terminals connected to the terminal 28. There is also a feedback path between the resistor terminal 20 and the other input of the amplifier. The amplifier 14 has a high open loop gain to provide substantially unity closed loop gain by virtue of the feedback path 15. On the other hand, the amplifier has a very high input impedance and a low output impedance for controlling the voltage at the terminal 20. This voltage will accordingly vary as shown in FIG. 3F and previously discussed.

Gyro torquer 16 is supplied with current through the amplifier 17, which may also be considered to be an operational amplifier. In other words, this amplifier has a very high input impedance as well as a very high output impedance. This will make the output current insensitive to voltage changes in gyro torquer 16. The output of the amplifier 17 is connected to torquer 16 through a closed switch 52 and the torquer in turn is connected to the input terminal 21 of the resistor 18 by another closed switch 53. This will cause current flow through torquer 16 in a positive direction as shown by arrow 54.

On the other hand, if switches 52 and 53 are opened, the current flow can be reversed by closing switch 55 connected between amplifier 17 and torquer 16 and switch 56 connected between the torquer and the junction point 21. These two pairs of switches, namely, 52, 53 and 55, 56 may be ganged together as shown schematically by the dotted lines. The switches 52, 53, 55 and 56 may be semiconductor devices such as transistors, and caused to switch to change the direction of the current flowing through gyro torquer 16 in response to switching logic 38.

It is switching logic 38 which determines how much current is applied to torquer 16 in one direction or the other. In other words, this is a simple two-state control for controlling the torquing rate of gyro 19. The torquing rate is controlled by the number of positive current pulses fed into gyro torquer 16 compared to the number of negative current pulses in a given period of time. See FIGS. 3C and 3D.

The operation of switching circuit 57, switching logic 38 and clock 34 has been explained above.

Another way of looking at the operation of operational amplifier 17 is to consider that it serves the purpose of maintaining the voltage at junction point 21 substantially constant. Thus the voltage of point 21 is compared to ground, and if there is a variation of the voltage, more or less current is supplied to the load until the voltage at point 21 again regains its original value.

The current which flows through the resistor 18 is shown by FIG. 3G. Since the input impedance of operational amplifier 17 is so large, the current flow through the amplifier 17 may be disregarded. Hence, the current flowing through resistor 18 is essentially the current that also flows through gyro torquer 16, shown in FIG. 3H, although the direction of current flow may be reversed by alternately opening and closing the two pairs of switches 52, 53 and 55, 56. Considering the curve shown in FIG. 3G, it will be seen that normally, say, 100 ma flows through the resistor 18. This corresponds to a voltage of −10v across the capacitor 40 and a junction point 20. However, when the voltage of junction point 20 is momentarily raised as shown in FIG. 3F. to, say, −10 mv, the current through resistor 18 is reduced to, say, 0.1 ma, as shown in FIG. 3G.

Accordingly, there is a ratio of 1000 to 1 between maximum and minimum current flow through either gyro torquer 16 or the resistor 18. It is during this period that the switches 52, 53 and 55, 56 are operated via switching logic 38 to control the direction of current flow in either a positive or a negative direction through gyro torquer 16 as shown in FIG. 3H. This means that any switching error will be reduced by a factor of 1000. It will therefore be apparent that the pulse generator of the present invention is precision controlled.

It will be obvious from the above explanation that the resistance value of the resistor 18 is critical. It should be controlled preferably within 0.01 percent. Therefore the operation of the pulse generator is controlled primarily by the provision of two precision voltages at the junction points 20 and 21 and by the precision resistor 18. It should be noted that it is preferred to have a small current flow through gyro torquer 16 and the resistor 18 while the current is switched from one direction to the other. See FIG. 3H.

It should also be realized that the current source 11, the pulse-forming network 12 and the amplifier 14 only serve the purpose to provide the desired voltage wave shown in FIG. 3F to the junction point 20. Furthermore, the purpose of this voltage wave is to make momentarily the voltages at points 21 and 20 substantially equal so that substantially no current flows through the resistor 18, and hence substantially no current flows through gyro torquer 16. In view of the fact that the rise and fall times of the current pulses shown in FIG. 3G is so exactly controlled, there is no need to have either a fast rise or fall time. It will also be appreciated that since the amplifier 17 is an operational amplifier with unity feedback, the voltage at point 21 practically does not change with variations of the current. Thus at point 21 the voltage may be considered to be precisely controlled by the operational amplifier 17.

There has thus been disclosed a pulse generator for delivering current pulses to a load with precisely controlled rise and fall times. This is accomplished by switching the direction of the current flow while there is substantially no current flow through either the torquer or a precision resistor. The current through the precision resistor is made substantially zero by periodically causing the voltages at the two terminals of the resistor to become substantially zero. This in turn is accomplished by a voltage pulse source including a current source, a pulse-forming network and an operational amplifier.

What is claimed is:

1. In a circuit for precisely controlling the current flow to a gyro torquer having a gimbaled gyro including said gyro torquer and a gyro pick-off for producing an error signal in response to gimbal movement from a preselected heading, a first pulse generator producing clock pulses, means for producing a pulse width modulated signal in response to said error signal, said means being clocked by said first pulse generator, a first current source producing precision current pulses, said first current source clocked by said first pulse generator, a switching circuit for reversing the current flow through said gyro torquer, and said switching circuit transferring the output of said current source to said gyro torquer in response to said pulse width modulated signal, an improved first current source comprising:

an impedance element;

a second current source including an operational amplifier for supplying current to said gyro torquer;

said switching circuit connected between said second current source and one terminal of said impedance element for reversing the current flow in said gyro torquer, said current flowing from said operational amplifier to said gyro torquer;

said operational amplifier having an input terminal connected to said one terminal of said element and responsive to the voltage at said one terminal;

said operational amplifier maintaining the voltage at said one terminal of said impedance element substantially constant; and a voltage pulse source connected to the other terminal of said impedance element for periodically rendering the voltage at said other terminal of said impedance element substantially equal to the voltage at said one terminal of said impedance element, thereby switching the direction of current flow through said gyro torquer at a time when there is substantially no current flow through said gyro torquer and through said impedance element; so that said gyro torquer moves the gimbal toward the preselected heading.

2. The circuit as claimed in claim 1 wherein said impedance element is a resistor.

3. The circuit as claimed in claim 2 wherein said voltage pulse source includes a voltage pulse-forming network, followed by a feedback amplifier having a feedback path from said other terminal of said resistor to said feedback amplifier.

4. The circuit as claimed in claim 3 wherein:

a third current source is provided coupled to said voltage pulse-forming network for supplying third current pulses thereto; and said third current pulses periodically changing their direction of current flow.

5. The circuit as claimed in claim 4 wherein said third current source includes:

a bridge rectifier network having four junction points;

a constant current network connected to two of said junction points;

a voltage source connected to the third junction point of said bridge network for controlling the direction of current flow through the rectifiers of said bridge network; and the fourth junction point of said bridge network being connected to said pulse-forming network; whereby the current supplied to said pulse-forming network periodically changes its direction of flow.

6. The current as claimed in claim 1 wherein said first current source comprises:

a resistor;

an operational amplifier for supplying current to the load;

said switching circuit including two pairs of switches connected between the output of said amplifier and one terminal of said resistor;

means for alternately opening and closing each pair of said switches, responsive to said pulse width modulated signal, causing reversing of the current flow through said gyro torquer, said current flowing from said operational amplifier to said gyro torquer;

said amplifier having an input terminal connected to said one terminal of said resistor and responsive to the voltage at said one terminal;

said operational amplifier maintaining the voltage at said one terminal of said resistor substantially constant;

a third current source for developing third current pulses which periodically change their direction of flow;

a capacitor coupled to said third current source for alternately charging or discharging said capacitor;

limiter means coupled to said capacitor for limiting the voltage across said capacitor to predetermined levels during both charging and discharging thereof; and a feedback amplifier having an input terminal coupled to said capacitor and having an output terminal coupled to the other terminal of said resistor; and said feedback amplifier having a feedback path between said other terminal of said resistor and the input of said feedback amplifier, thereby to render the voltage at said other terminal of said resistor substantially equal to the constant voltage at said one terminal thereof to substantially prevent current flow through said resistor and through said gyro torquer; whereby precision switching of the direction of flow of the current pulses through said gyro torquer occurs substantially in the absence of current.

7. The circuit as claimed in claim 6 wherein said limiter means includes:

a zener diode connected across said capacitor for limiting the voltage thereacross in one direction;

two diodes and a resistor connected in series and across said capacitor; and a fourth constant current source connected between said two diodes for limiting the voltage across said capacitor in the other direction.

8. The circuit claimed in claim 6 wherein said current source includes:

a bridge rectifier network having four junction points;

a constant current network connected to two of said junction points;

a voltage source connected to the third junction point of said bridge network for controlling the direction of current flow through the rectifiers of said bridge network; and the fourth junction point of said bridge network being connected to said pulse-forming network; whereby the current supplied to said pulse-forming network periodically changes its direction of flow.

* * * * *